(12) United States Patent
Döring

(10) Patent No.: US 7,850,934 B2
(45) Date of Patent: Dec. 14, 2010

(54) PARTICLE SEPARATOR AND METHOD FOR REMOVING PARTICLES FROM AN EXHAUST GAS STREAM OF AN INTERNAL COMBUSTION ENGINE

(75) Inventor: Andreas Döring, München (DE)

(73) Assignee: MAN Nutzfahrzeuge AG (DE)

( * ) Notice: Subject to any disclaimer, the term of this patent is extended or adjusted under 35 U.S.C. 154(b) by 0 days.

(21) Appl. No.: 12/487,572

(22) Filed: Jun. 18, 2009

(65) Prior Publication Data

US 2009/0317314 A1 Dec. 24, 2009

(30) Foreign Application Priority Data

Jun. 21, 2008 (DE) .................. 10 2008 029 521

(51) Int. Cl.
*B01D 45/00* (2006.01)
*B01D 46/00* (2006.01)
*B01D 53/92* (2006.01)
*B01D 53/94* (2006.01)

(52) U.S. Cl. ................. 423/212; 423/213.2; 423/215.5; 55/343; 55/344; 55/486; 55/487; 60/311; 60/297; 95/273; 95/285

(58) Field of Classification Search ............ 55/343, 55/344, 486, 487; 60/311, 297; 95/273; 95/285; 423/212, 213.2, 215.5
See application file for complete search history.

(56) References Cited

U.S. PATENT DOCUMENTS

| 2,942,687 | A | | 6/1960 | Kollander |
|---|---|---|---|---|
| 4,351,811 | A | | 9/1982 | Matsuda et al. |
| 4,659,348 | A | * | 4/1987 | Mayer ........................ 55/320 |
| 4,902,487 | A | * | 2/1990 | Cooper et al. ............ 423/215.5 |
| 5,281,245 | A | | 1/1994 | Yang |
| 5,865,864 | A | * | 2/1999 | Bruck ........................ 55/482 |
| 6,926,828 | B2 | * | 8/2005 | Shiraishi et al. ............ 210/310 |
| 7,056,365 | B2 | * | 6/2006 | Ichikawa et al. ............ 55/523 |
| 7,238,217 | B2 | * | 7/2007 | Cutler et al. ............... 55/523 |

FOREIGN PATENT DOCUMENTS

| EP | 1072765 | 6/2004 |
|---|---|---|
| GB | 895990 | 5/1962 |
| JP | 2005330346 | 12/2005 |

* cited by examiner

*Primary Examiner*—Timothy C Vanoy
(74) *Attorney, Agent, or Firm*—Robert W. Becker; Robert Becker & Assoc.

(57) ABSTRACT

A particle separator and method for removing particles from an exhaust gas stream of an internal combustion engine. Differing flow regions having different flow conditions are formed in the particle separator. The differing flow regions are configured such that essentially particles having different, defined sizes and/or masses are adapted to be separated out of the exhaust gas stream in the differing flow regions. The exhaust gas stream is adapted to flow through at least portions of the particle separator.

37 Claims, 4 Drawing Sheets

PARTICLE SEPARATOR AND METHOD FOR REMOVING PARTICLES FROM AN EXHAUST GAS STREAM OF AN INTERNAL COMBUSTION ENGINE

BACKGROUND OF THE INVENTION

The present invention relates to a particle separator for removing particles from an exhaust gas stream of an internal combustion engine. The present invention also relates to a method for removing particles from an exhaust gas stream of an internal combustion engine.

During combustion in a diesel engine, and also during direct injection with a spark ignition engine, emissions of particles occur that among other reasons result due to the incomplete combustion of the fuel, and predominantly comprise carbon black. To burn this carbon black, GB 895,990 A proposes burning or treating them with $NO_2$ as oxidizing agent instead of oxygen.

It is furthermore known from U.S. Pat. No. 4,902,487 to separate off carbon particles at a filter, and to subsequently oxidize the particles with $NO_2$. To produce the $NO_2$, pursuant to DE 28 320 02, for example, the NO contained in the exhaust gas stream of the internal combustion engine can be oxidized on a platinum-containing catalyst to form $NO_2$. The proportion of $NO_2$ in relationship to the total $NO_x$ is thereby significantly increased, whereby this reaction occurs starting at approximately 180° C. In contrast, the combustion of the particles by $NO_2$ begins at temperatures starting at 250° C. A particle oxidation in the gas phase practically does not occur. For this purpose, a deposition on a solid material is necessary in order to achieve an adequate retention time, which is generally realized by the use of a particle filter.

A significant drawback of such a procedure, however, is the high exhaust gas counter pressure that is caused by the filter. This becomes noticeable by an increased fuel consumption. In addition, during the operation non-combustible constituents are also deposited on the filter, such as lubricating oil ash. As a result, the exhaust gas counter pressure continuously increases, so that the filter must be regularly and frequently replaced in order to avoid an even greater fuel consumption, and possibly also damage to the internal combustion engine. Furthermore, insufficient oxidation can result in an ever increasing coating with soot, which can ultimately lead to clogging of the filter.

To avoid these drawbacks, it is already know from EP 1 072 765 B1 to use a particle separator that has no filter, whereby the exhaust gas stream is guided along a structural surface and is constantly deflected, so that the particles can separate out from the exhaust gas stream by thermophoresis, convection or diffusion. With particle separation by thermophoresis, the surfaces of the particle separator are cooled, so that the surfaces are significantly cooler than is the exhaust gas stream. As a result, the particles are deposited or precipitate on the surface, where they are catalytically oxidized with the $NO_2$ produced at an oxidation catalytic converter. With a particle separator designed according to the convection principle, this surface structure is configured such that the particles are constantly forced toward surface contact, and are then separated off at these surface structures, where they can finally also be catalytically oxidized with the aid of the $NO_2$. Particle separators designed pursuant to the diffusion principle are provided with so-called flow dead zones, for example on the lee side of guide plates. In these flow dead zones, the flow velocity decreases toward zero, so that here the exhaust gas stream has a relatively long retention time, so that particles can diffuse out of the exhaust gas stream into the stream dead zones in order to compensate for the concentration differences that locally exist here. However, a drawback of this is that the separating off of the particles by diffusion deteriorates as the particle diameters increase, so that here larger particles cannot be separated off at all or only very slightly. Since with the adoption of spherical particles the particle mass increases pursuant to $m_{Particle} = \frac{1}{6} \times d^3 \times \pi \times \rho$, with the particle diameter d to the third power, with these separators it is possible to achieve only a relatively low reduction of the particle mass; in other words, essentially only very fine particles are removed, which means that as previously, a large residual particle mass remains in the exhaust gas stream, which constitutes the greater particle mass.

In contrast, it is an object of the present invention to provide a particle separator, as well as a method, for removing particles from an exhaust gas stream of an internal combustion engine, by means of which all sizes of particles, in other words in particular very fine particles as well as larger and/or heavier coarse particles, can reliably and in a straightforward manner be removed from the exhaust gas stream.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
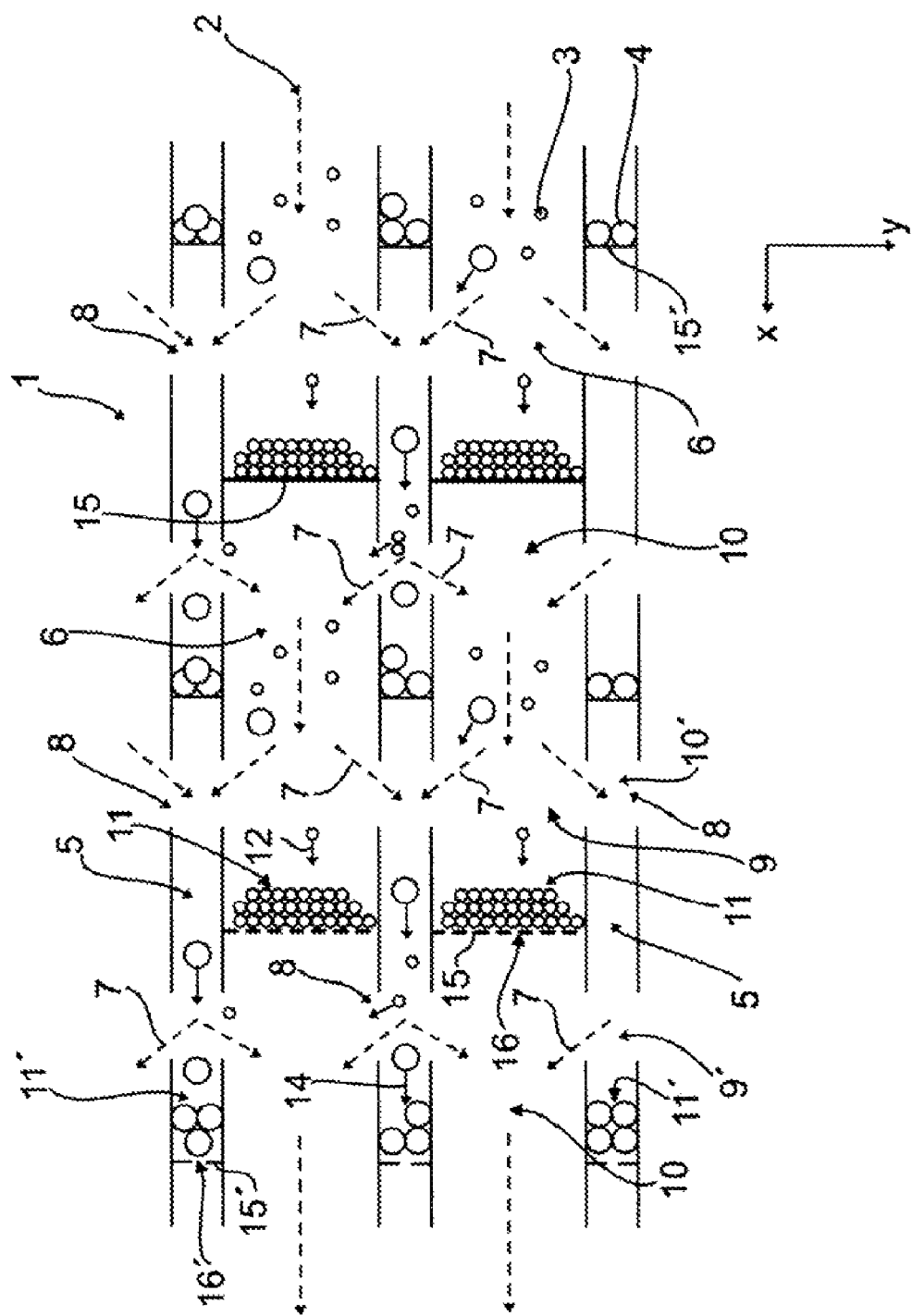
FIG. 1 is a schematic plan view onto a portion of an inventive particle separator having, by way of example only, two groups of different flow zones or regions.

The object of the present invention is realized by a particle separator having formed therein differing flow regions having different flow conditions, wherein the differing flow regions are configured such that essentially particles having different, defined sizes and/or masses can be separated out of the exhaust gas stream in the differing flow regions, and wherein the exhaust gas stream is adapted to flow through at least portions of the particle separator. In a particularly advantageous manner, differing flow regions that in particular are spatially separated from one another are formed in the particle separator in order to achieve an essentially separate removal of, on the one hand, very fine particles having a prescribed size by means of, in particular, diffusion, and on the other hand of, by comparison, defined or prescribed larger and/or heavier coarse particles on the basis of their mass moment of inertia. In a particularly advantageous manner, the differing flow regions can differ with respect to the flow velocity and/or the retention time of the exhaust gas stream in the flow regions.

The basic inventive concept thus comprises linking or combining a particle separation or removal by diffusion with a particle separation or removal based on the mass moment of inertia of specific particles. For this purpose, the exhaust gas stream is preferably constantly deflected or shunted, so that, for example, flow dead zones and/or turbulence are produced that ensure the removal of very fine particles by diffusion. Furthermore, in other, preferably spatially separated, regions the flow velocity of the exhaust gas stream is increased, and this exhaust gas stream is subsequently preferably abruptly deflected or shunted, so that the heavier particles, due to their greater inertia, can no longer follow the exhaust gas stream in the region of the deflection, and essentially continue to travel straight ahead. Devices are then preferably provided downstream of this deflection for collecting the particles, in particular blind-end bore like storage spaces, which form a clearance volume space, or particle collection devices and/or storage devices, all of which will be discussed in greater detail subsequently.

So that the particle separator can form these differing flow regions, the particle separator can be provided with means for accelerating and/or slowing down and/or deflecting the exhaust gas stream in the particle separator. Several possibilities can be provided to accomplish this. It is particularly straightforward and advantageous to form the differing flow regions by, for example, differently sized free flow cross-sections. In this connection, as viewed in the direction of flow of the exhaust gas stream, the differing flow regions can be disposed one after another and/or next to one another and/or one above another, depending upon the concrete construction of the particle separator. It is particularly important in this connection, especially in conjunction with those flow regions that have a high flow velocity of the exhaust gas stream, that in addition means be provided by means of which the exhaust gas stream in the particle separator can be repeatedly deflected and/or split into partial exhaust gas streams in order in a straightforward manner, with a high functional reliability, to be able to ensure that the coarse particles can be removed from the exhaust gas stream in the manner previously described due to their mass moment of inertia. In a particularly preferred manner, for this purpose the particle separator is provided with a plurality of flow channels, whereby at least a portion of the flow channels have flow-through openings by means of which at least a portion of the flow channels are in flow communication. With such a configuration, which in particular forms a honeycomb structure, deflections are particularly easy to produce.

The differing flow regions can be arranged in such a way that at least a partial exhaust gas stream of the exhaust gas stream, which flows through a first flow region with a defined flow velocity and/or defined retention time, flows into a second flow region, which differs with regard to the flow velocity and/or retention time of the exhaust gas stream relative to the first flow region. The terms "first" and "second" in conjunction with the flow regions here specifically imply no limitation to merely two differing types of flow regions, even if such is the preferred embodiment; rather, such a description is merely used here for simplification reasons for a better differentiation of the differing flow regions. It is to be understood that also more than two differing flow regions or differing groups of the same flow regions can be provided. With such a flow transfer into differing layer regions, for example in conjunction with a high velocity flow region, in which the exhaust gas stream flows with a prescribed high velocity, the deflection or transfer into a flow region that in contrast has or forms a lower flow velocity ensures that first of all, due to their high velocity, and the then abrupt deflection into the adjoining flow region, coarse particles are separated out of or removed from the exhaust gas stream due to their mass moment of inertia, whereas subsequently in the then by contrast "slower" flow region, a removal or separation of very fine particles by diffusion can be effective. Such a configuration is particularly preferred, as already indicated above, if a plurality, preferably two, of groups of differing flow regions are formed, whereby the flow regions of each group have an essentially identical configuration. From a manufacturing stand point, such a configuration is easy to realize.

Particularly good separation or removal results can be achieved with a concrete configuration where at least portions of the differing, adjacent flow regions, as viewed in the direction of flow, are offset relative to one another in such a way that a discharge opening of a first flow region forms an intake opening of a second flow region that differs relative to the first flow region. With such an arrangement, it is possible at the same time to achieve a compact and optimized construction of a particle separator with which the exhaust gas stream can be functionally reliably accelerated, slowed down and deflected in the aforementioned manner.

For an effective and optimal separation or removal of the individual particles, it is particularly advantageous if a particle collection and/or storage device is associated with each of the differing flow regions, whereby such devices are in particular formed by a blind-end bore type clearance volume space, in particular by a blind-end bore type flow channel portion having a baffle base essentially oriented perpendicular to the exhaust gas stream. In this connection, the particle collection and/or storage device can, as viewed in the direction of flow of the exhaust gas stream, be disposed upstream of an intake opening and/or downstream of a discharge opening of the respective flow region.

The oxidation of the removed, carbon-containing particles can be effected or accelerated by raising the exhaust gas temperature and/or with the aid of $NO_2$ formed on a catalyst for the oxidation of NO.

In the above-described particle collection and/or storage devices, it is possible to store a large quantity of particles, especially of soot. Under certain circumstance, especially in conjunction with blind-end bore type particle collection and/or storage devices, it is possible, however, that the $NO_2$ necessary for the oxidation can enter into the particle collection and/or storage devices only through the relatively slow process of diffusion. As a result, the particle oxidation in the, for example, blind-end bores, as particle collection and/or storage devices, can be relatively poor due to the localized lack of $NO_2$ caused by the too slow supply of nitrogen dioxide. It is therefore expedient to convey a small portion of the $NO_2$-containing flow in the form of a bypass through the, for example, blind-end bore as a particle collection and/or storage device. However, in doing so one must take care that the flow velocity does not become too high in order to prevent the collected particles from being blown out. The bypass flow can be realized by perforation of the wall region of the particle collection and/or storage device, and/or by using a porous material. In particular in conjunction with the perforation of the particle collection and/or storage device embodied, for example, as a blind-end bore, it has been shown to be advantageous to allow not more than 30% of the exhaust gas stream of a respective flow region to flow out of the flow region through the particle collection and/or storage device in order to prevent the particles removed there from churning up.

Pursuant to a further particularly preferred embodiment of the invention, the particle separator can be catalytically active in at least portions thereof, in particular being coated with a catalytically active coating.

A particularly economical construction of the particle separator results if it is formed of a plurality of separator plates that are interconnected in superimposed layers, and that form a set of plates. The differing flow regions and/or the deflection regions and/or the separation regions and/or the collection regions and/or the storage regions and/or the flow-through openings can, in this connection, viewed entirely in general be formed in a straightforward manner by material shaping and/or material deformation and/or material stamping and/or material recesses at prescribed regions of at least a portion of the separator plates of a set of plates. For this purpose, it is advantageous if at least a portion of the separator plates of a set of plates have an essentially identical configuration, although this is not absolutely necessary. The individual separator plates are particularly advantageously formed by foils and/or mats having a prescribed thickness. Such foils and/or mats can be very easily shaped, for example such that at least one of the foils is wave-shaped or corrugated, whereby the term corrugated or wave like configuration is here to be understood in a broad sense, and in particular also includes shapings, profilings, or the like that are folded or bent in an accordion-like manner. With such corrugated, for example foils, as separator plates, it is possible in combination with further separator plates embodied, for example, as foils to form in a straightforward manner the appropriately desired number and geometry of the flow channels of the particle separator. By providing constrictions or indentations having the same or different corrugation or wave amplitudes (height) and/or different or the same corrugation frequencies (number of corrugations), it is possible in a relatively straight-forward manner to alter the free flow cross-section and hence the flow velocity, or to achieve a deflection, or individual regions can be completely separate from the flow in order to provide, for example, the desired dead zones. In this connection, it can be particularly advantageous, when viewed in the direction of flow, for successive constrictions to constrict the corrugated profile alternatingly first from the upper side and then from the underside. In addition, relative to different plate planes, the constrictions can also be offset relative to one another, for example such that the constrictions relative to adjacent plate planes are offset relative to one another by half of the spacing between the constrictions.

Furthermore, such separator plates formed by, for example, dimensionally stable foils and/or mats can be easily perforated, thus enabling a transition into adjacent flow channels.

It is particularly advantageous to alternatingly provide, for example, foils as separator plates, with different amplitudes and/or frequencies of the corrugation or bend, so that regions having different flow cross-sections, in other words different cellular densities and hence different flow velocities, result.

If the foils form, for example, parallel flow channels, a smooth layer should be provided as an intermediate layer in order to prevent the corrugated foils from slipping into one another.

It is, of course, also possible to alter the amplitude and/or frequency of the corrugation or bend along a separator plate, for example a foil.

The separator plates can, for example, be produced from a ceramic and/or metallic and/or silicon-containing and/or silicon carbide containing and/or quartz-containing and/or fibrous material. In this connection, at least portions of the separator plates can be provided with a surface structure having a defined, in other words prescribed, roughness or peak to valley height, for example by means of mechanical processing, which will be described in detail subsequently. The transition into the individual regions, in particular the flow-through opening to the adjacent, preferably differing, lower regions, can be effected by providing the, for example, foils and/or mats as separator plates with perforations and/or slots.

The separation or removal of the particles by diffusion and inertial forces is made possible by the method of the present invention using the described particle separator, which is configured to have differing flow regions having different flow conditions, wherein the differing flow regions are configured such that essentially particles having different, defined sizes and/or masses are adapted to be separated out of the exhaust gas stream in the differing flow regions. The oxidation of the separated-off or removed, carbon-containing particles can, as described above, be effected or accelerated by raising the exhaust gas temperature and/or with the aid of $NO_2$ formed on a catalytic converter or catalyst for the oxidation of NO. Due to the changing or sometimes too low exhaust gas temperatures, and the changing $NO_x$ raw emissions of intermittently operated internal combustion engines, however, there is often insufficient $NO_2$ for oxidizing the removed soot. This means that the separator must store the particles for a sufficient length of time until at a later point in time sufficient $NO_2$ is present for the oxidation of the removed soot. This can be realized, for example, by improving the adhesion of the particles on the surface of the particle separator or the separator plates. For this purpose, surfaces having a high degree of roughness should be used. For metal foils, this means that they should be roughened, for example by mechanical processing. This can take place, for example, by brushing, grinding, scouring, radiation or blasting (e.g. sand blasting), corona irradiation or blasting, stamping or needling. A chemical treatment is also conceivable, such as etching, galvanizing or eloxadizing. In addition, the alloy of the, for example, foil as separator plate can be tailored in such a way that the surface structure thereof changes under the effect of heat and/or by variation of the pH value. One example of this is the addition of large quantities of aluminum, which migrates at high temperatures along the surface, where it forms aluminum clusters.

In conjunction with a concrete configuration, it is particularly advantageous to dispose the at least one particle separator together with at least one catalytic converter in a muffler of an exhaust gas unit.

Further specific features of the invention will be described in detail subsequently.

DESCRIPTION OF SPECIFIC EMBODIMENTS

Referring now to the drawings in detail, FIG. 1 schematically shows a parallel section through at least a portion of a first embodiment of an inventive particle separator 1, and hence is quasi a plan view onto a specific portion of the particle separator 1, illustrating in principle the flow of the exhaust gas stream 2 in conjunction with the separation or removal of very fine particles 3 and large or coarse particles 4.

For the configuration with regard to the flow conditions, in particular with regard to the flow velocity and the retention time of the exhaust gas stream in various separator zones, the particle separator 1, by way of example only, has two groups of different flow regions, which here, within each of the two groups, are essentially identically embodied as high velocity flow regions 5 and low velocity flow regions 6.

In contrast to the low velocity flow regions 6, the high velocity flow regions 5 have a distinctly smaller free flow cross-sectional area, smaller for example by at least a factor of 2, so that the respective partial exhaust gas stream in the high velocity flow regions 5 has a greater flow velocity than does the partial exhaust gas stream in the low velocity flow regions 6.

Not only the high velocity flow regions 5, but also the low velocity flow regions 6, are here embodied in the form of flow chambers that are closed at the ends as viewed in the direction of flow x, whereby in the direction of flow x, a plurality of such low velocity flow regions 6 and high velocity flow regions 5 are disposed directly one after the other. The direction of flow x here corresponds to the main flow direction of the overall exhaust gas stream through the particle separator.

As can be further seen from FIG. 1, as viewed transverse to the direction of flow (the transverse direction y), the high velocity flow regions 5 and the low velocity flow regions 6 are alternatingly arranged, and in addition, viewed in the direction of flow x, are offset in such a way that partial exhaust gas streams 7 from a central to rear flow region portion 9 of the low velocity flow regions 6, as viewed in the direction of flow x, flow, via side flow-through openings 8 as viewed in the direction of flow x, into a forward to middle flow region portion 10' of adjacent high velocity regions 5 as viewed in the direction of flow x. Conversely, due to this offset arrangement of the high velocity flow regions 5 relative to the low velocity flow regions 6, partial exhaust gas streams 7 from a central to rear flow region portion 9' of the high velocity flow regions 5 flow, via corresponding flow-through openings 8, into a forward to central flow region portion 10 of the low velocity flow regions 6. Accordingly, the rear flow-through openings 8, as viewed in the direction of flow x, respectively form the discharge openings for the partial exhaust gas streams 7, while the forward flow-through openings 8 of the respective regions 5, 6, as viewed in the direction of flow x, form the intake openings. In this connection, for example the forward flow-through openings of the low velocity flow region 6 can differ in shape and/or size from the rear flow-through openings of the low velocity flow region 6, so that with the arrangement shown in FIG. 1, then accordingly also the rear and forward flow-through openings of the high velocity flow region 5 can differ in shape and/or size. However, the flow-through openings could, for example, also vary in shape and/or size along the direction of flow x, as a result of which the separator characteristic along the flow, and hence between the separator inlet and outlet, can be varied.

As can be further seen in FIG. 1, as viewed in the direction of flow x upstream or downstream of the flow-through openings 8, in other words in the end region of the respective chamber-like flow regions 5 and 6, so-called blind-end bores 11 and 11' are formed as particle collection and storage devices, which provide a type of clearance volume space. The manner of operation of the inventive particle separator 1 will now be described in detail with the aid of FIG. 1. Due to the relatively large free flow cross-section in the low velocity flow regions 6, the partial exhaust gas streams 7 are slowed down or retarded such that the exhaust gas stream in the low velocity flow region 6 has a very low flow velocity. The design of the low velocity flow region 6 is such that the flow velocity of the exhaust gas stream is low enough that very fine particles 3 of a specific, predetermined size and/or mass diffuse away from the exhaust gas stream into the blind-end holes 11 of the low velocity flow regions 6, where they are temporarily stored. This fine particle diffusion is designated by the reference numeral 12 in FIG. 1. In contrast, the particles that are larger and/or heavier than are the fine particles 3, and which are here designated as large particles 4, pass with the exhaust gas stream or here for example with the partial exhaust gas streams 7 via the appropriate flow-through openings 8 into the high velocity flow regions 5, where the exhaust gas streams are again accelerated due to the reduced free flow cross-sectional area. These free flow cross-sections in the high velocity flow regions 5 are designed such that the exhaust gas stream in these high velocity flow regions 5 are accelerated to such a flow velocity that the sudden, sharp deflection of the exhaust gas stream into the adjoining low velocity flow regions 6, which is caused by the discharge of the partial exhaust gas streams 7 out of the side flow-through openings 8 of the high velocity flow regions 5, results in the large particles 4 no longer remaining in the partial exhaust gas streams 7 due to the mass moment of inertia of the large particles 4. As illustrated by the reference numeral 14, the large particles 4 quasi continue to move straight ahead and are collected by the blind-end bores 11' of the high velocity flow regions 5, where the large particles 4 are temporarily stored.

As is schematically illustrated on the left half of FIG. 1 with the outermost, left blind-end bores 11' of the high velocity flow regions 5, or the blind-end bores 11 of the low velocity flow regions 6, the baffles 15, 15' that form the bases of the blind-end bores 11, 11' respectively can be perforated, whereby the gas permeability is preferably set by means of these perforations 16, 16' in such a way that at most 30% of the exhaust gas stream in the respective flow region can escape from the respective flow region through the baffle 15, 15'. Alternatively, the baffles 15, 15', or also further zones of the respective flow regions 5, 6, can be formed of a gas permeable material, and in particular at least portions thereof.

Figure 2:
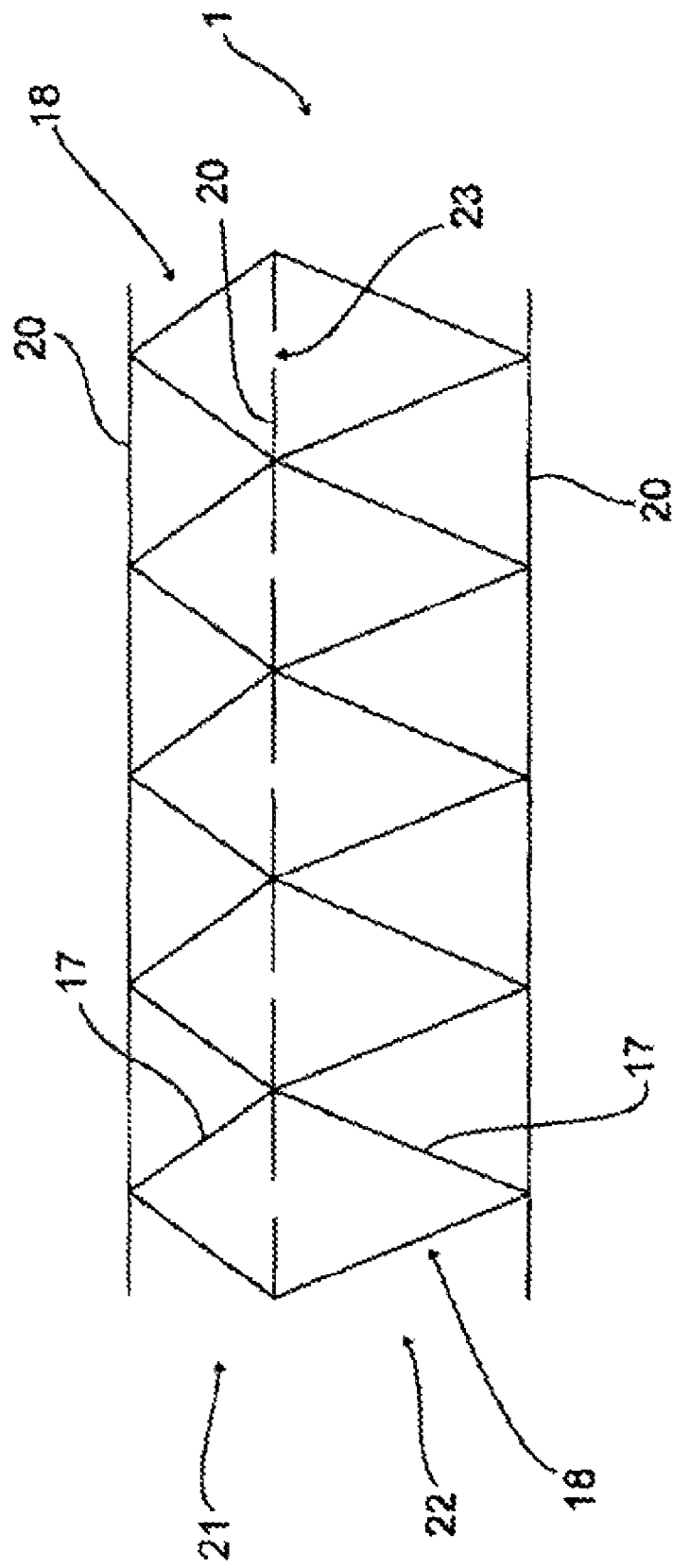
FIG. 2 is a cross-section through an exemplary embodiment of an inventive particle separator that, by way of example only, is provided with two superimposed corrugated layers having different amplitudes, i.e. corrugation heights, yet have the same frequency, whereby a smooth layer is provided between the two corrugated layers.

As can be seen in particular in FIG. 2, the particle separator 1 is preferably embodied as a plate separator composed of a plurality of superimposed separator plates that form a set of plates and that are interconnected in superimposed layers. As an illustration, a cross-section through one set of plates is selected, whereby the direction of flow x is into the drawing plane. The plate planes can be embodied in a planar manner or also in a curved manner, in particular if the plates are rolled up to form a set of plates.

A first portion of these separator plates is here formed by thin metal sheets or foils 17 that, when viewed along the direction of flow, form a corrugated profile 18 and hence form a corrugated layer.

As can furthermore be seen from FIG. 2, in addition to the metal foils 17 as separator plates, which have a corrugated profile 18, so-called smooth or even layers can also be provided as further separator plates that here are formed by a smooth metal sheet or foil 20, and that alternate with the metal foils 17 that have a corrugated profile 18. These smooth metal foils 20 ensure that the two corrugated layers 21 and 22, which differ with regard to their corrugated profiles 18, cannot slip into one another. Flow-through openings 23 can also be formed in the smooth layer formed by the smooth metal foils 20. As can furthermore be clearly seen from FIG. 2, although the corrugated layers 21, 22 here have a comparable wave or corrugation frequency, they have different corrugation amplitudes, i.e. corrugation heights.

To improve the adhesion of the particles to the surface, all of the metal foils 17, 20 can be provided with a high surface roughness and/or can be coated with a catalytically active coating.

Figure 3:
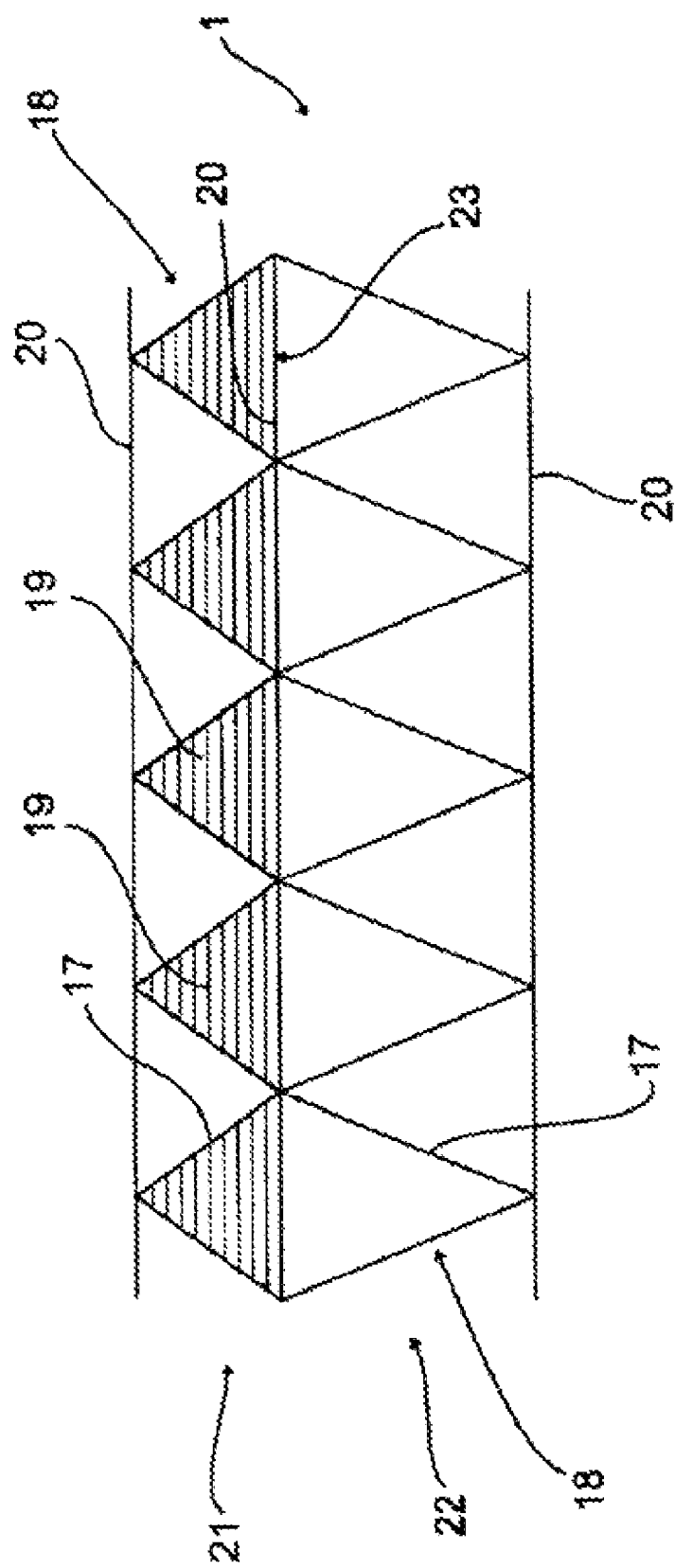
FIG. 3 is an illustration pursuant to FIG. 2, yet relative to a different section plane that shows constrictions or indentations.

The metal foils 17 that have a corrugated profile 18 can additionally, as viewed in the direction of flow x, be provided with constrictions as indentations, which here, by way of example only, are equally spaced from one another. By means of these constrictions, the previously described clearance volume spaces, and hence flow interruptions, can be configured in a particularly straightforward manner. In FIG. 3, this is illustrated with the aid of a different section plane, which is disposed further downstream than is the case in FIG. 2; here a portion of the upper channels are closed off by indentations 19. Upstream of these indentations 19, the flow must be deflected or shunted into adjacent channels via the flow-through openings 23 described in conjunction with FIG. 2.

Figure 4:
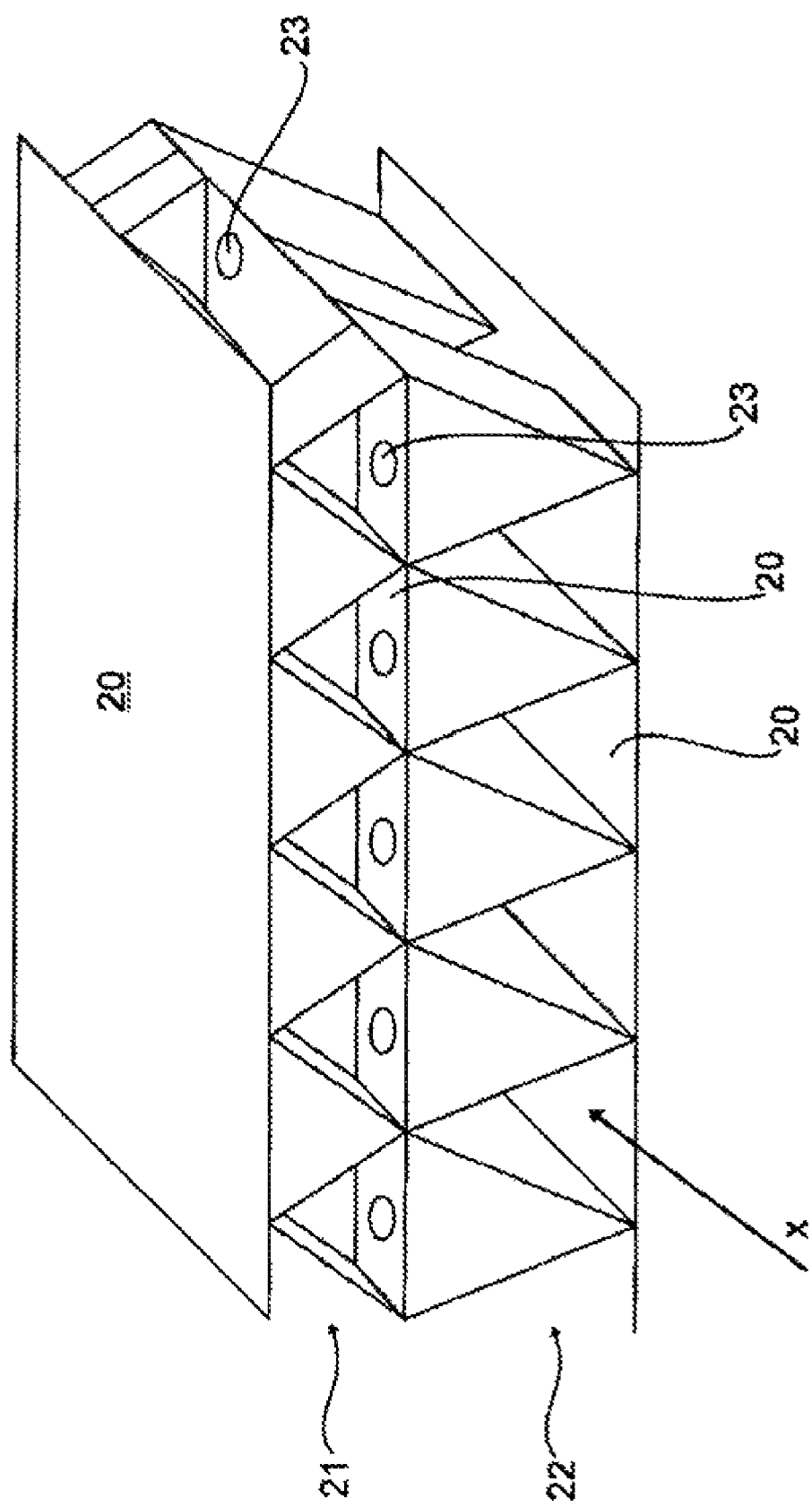
FIG. 4 is a perspective view of a portion of an exemplary embodiment of an inventive particle separator.

FIG. 4 shows a schematic, perspective illustration of a portion of an inventive separator that is comprised of two corrugated layers 21, 22 having interposed smooth layers 20. By means of flow-through openings 23 provided in the smooth layers 20, the gas stream, which is laden with particles, is alternatingly conveyed between the corrugated layer 21 having the lower amplitude. In other words greater flow velocity, and the corrugated layer 22 having the high amplitude, in other words the lower flow velocity. This takes place by an alternating closing off of the channels, for example by the above-described indentations of metal foils that form the corrugated layers 21, 22.

The specification incorporates by reference the disclosure of priority document DE 10 2008 029 521.3 filed 21 Jun. 2008.

The present invention is, of course, in no way restricted to the specific disclosure of the specification and drawings, but also encompasses any modifications within the scope of the appended claims.

What I claim is:

1. A particle separator for removing particles from an exhaust gas stream of an internal combustion engine, wherein differing flow regions having different flow conditions are formed in said particle separator, further wherein said differing flow regions are configured such that essentially particles having different, defined sizes and/or masses are adapted to be separated out of the exhaust gas stream in said differing flow regions, and wherein the exhaust gas stream is adapted to flow through at least portions of said particle separator, wherein said differing flow regions are spatially separated from one another in said particle separator for an essentially separate removal of defined very fine particles essentially by diffusion, and of defined larger and/or heavier coarse particles based on their mass moment of inertia.

2. A particle separator according to claim 1, wherein said differing flow regions differ from one another with respect to at least one of flow velocity and retention time of the exhaust gas stream in said flow regions.

3. A particle separator according to claim 1, wherein for forming said differing flow regions, said particle separator is provided with means for effecting at least one of accelerating and slowing down the exhaust gas stream in said particle separator.

4. A particle separator according to claim 3, wherein said means comprises differently sized free flow cross-sections of said differing flow regions.

5. A particle separator according to claim 4, wherein as viewed in a direction of flow of the exhaust gas stream, said different flow regions are disposed one after another and/or next to one another and/or over one another.

6. A particle separator according to claim 5, further comprising means for repeatedly deflecting the exhaust gas stream in said particle separator and/or for dividing the exhaust gas stream into partial exhaust gas streams.

7. A particle separator according to claim 6, wherein said differing flow regions are arranged in such a way that a partial exhaust gas stream of said exhaust gas stream that flows through a first one of said differing flow regions with a defined flow velocity and/or a defined retention time, flows into a second one of said differing flow regions that differs from said first flow region relative to flow velocity and/or retention time of the exhaust gas stream.

8. A particle separator according to claim 7, wherein a plurality of groups of differing flow regions are provided, and wherein the flow regions of each group have an essentially identical configuration.

9. A particle separator according to claim 7, wherein at least portions of adjacent, preferably differing, flow regions, as viewed in the direction of flow, are offset relative to one another in such a way that a discharge opening of a first one of said flow regions forms an intake opening of a second one of said flow regions, which differs relative to said first flow region.

10. A particle separator according to claim 5, wherein said different flow regions form a plurality of flow channels, further wherein at least a portion of said flow channels, in particular relative to an opening cross-section thereof, are oriented transverse to the direction of flow of the exhaust gas stream and/or are provided with flow-through openings formed in a lateral flow channel wall region, and wherein at least a portion of said flow channels are in flow communication via said flow-through openings.

11. A particle separator according to claim 10, wherein at least a portion of said flow-through openings differ with respect to their shape and/or size, especially along a direction of flow of the exhaust gas stream.

12. A particle separator according to claim 1, wherein at least one of a particle collection device and a storage device is associated with each of said differing flow regions.

13. A particle separator according to claim 12, wherein said particle collector and/or particle storage device is formed by a storage space or blind-end bore type clearance volume space.

14. A particle separator according to claim 13, wherein said particle collector and/or particle storage device is formed by a blind-end bore type flow channel section having a baffle base wall that is oriented essentially perpendicular to the exhaust gas stream.

15. A particle separator according to claim 12, wherein said particle collection and/or particle storage device, as viewed in the direction of flow of the exhaust gas stream, is disposed upstream of an intake opening of a respective flow region and/or downstream of a discharge opening of a respective flow region.

16. A particle separator according to claim 12, wherein prescribed portions of said particle collection and/or particle storage device are gas permeable, and wherein in particular prescribed wall portions of said particle collection and/or particle storage device are perforated and/or are made of a gas permeable material.

17. A particle separator according to claim 16, wherein said gas permeability is such that a prescribed quantity of the exhaust gas stream in a respective one of said differing flow regions flows out of said flow region through said particle collection and/or particle storage device.

18. A particle separator according to claim 1, wherein at least portions of said particle separator are catalytically active, by being provided with a catalytic coating.

19. A particle separator according to claim 1, which is formed of a plurality of separator plates that are interconnected in superimposed layers and form a set of plates.

20. A particle separator according to claim 19, wherein individual ones of said separator plates are formed of foils and/or mats having a prescribed thickness.

21. A particle separator according to claim 19, wherein said separator plates are produced of at least one of the group consisting of metallic, ceramic, silicon-containing, silicon carbide-containing, quartz-containing and fiber-containing material.

22. A particle separator according to claim 19, wherein at least portions of said separator plates are provided with a surface structure having a prescribed magnitude of roughness or peak to valley height.

23. A particle separator according to claim 19, wherein said differing flow regions and/or deflection regions and/or separation regions and/or collection regions and/or storage regions and/or flow-through openings are formed by material shaping and/or material deformation and/or material stamping and/or material recessing at prescribed regions of at least a portion of said separator plates of a set of plates.

24. A particle separator according to claim 19, wherein at least a portion of said separator plates of a set of plates has an essentially identical configuration.

25. A particle separator according to claim 19, wherein at least a portion of said set of plates is formed of separator plates that essentially transverse to and/or along a direction of flow of the exhaust gas stream has a corrugated or wavelike configuration and forms a corrugation layer.

26. A particle separator according to claim 25, wherein said separator plates, which form a corrugation layer, are provided with constrictions, wherein said constrictions are spaced from one another in the direction of flow of the exhaust gas stream, further wherein said constrictions extend essentially transverse to the direction of flow, and wherein said constrictions interrupt a corrugated profile, and hence a longitudinal path, of flow channels formed by said corrugated profile.

27. A particle separator according to claim 26, wherein a side portion of said separator plates, that form a corrugation layer, is provided upstream or downstream of each constriction with at least one flow-through opening for the exhaust gas stream.

28. A particle separator according to claim 26, wherein when viewed in the direction of flow, successive ones of said constrictions constrict said corrugated profile alternatingly first from one side and then from an opposite side.

29. A particle separator according to claim 25, wherein said differing flow regions are formed by different amplitudes and/or frequencies of said corrugated profile of at least one separator plate that forms a corrugation layer.

30. A particle separator according to claim 29, wherein said differing flow regions are formed by different amplitudes and/or frequencies of said corrugated profile of different separator plates that form a corrugation layer.

31. A particle separator according to claim 25, wherein said set of plates is provided with planar separator plates that form a smooth layer and that alternate with separator plates that are provided with a corrugated profile and form a corrugated layer.

32. A particle separator according to claim 1, which when viewed in cross-section has a honey-combed structure, and wherein each individual honeycomb thereof represents a flow cross-section of a specific section of a flow channel as viewed in a direction of flow of the exhaust gas stream.

33. A particle separator according to claim 1, wherein at least one of said particle separators, together with at least one catalytic converter, is disposed in a muffler of an exhaust gas unit.

34. A method for removing particles from an exhaust gas stream of an internal combustion engine, including the steps of:
  passing the exhaust gas stream through at least portions of a particle separator;
  configuring the particle separator to have differing flow regions having different flow conditions, wherein said differing flow regions are configured such that essentially particles having different, defined sizes and/or masses are adapted to be separated out of the exhaust gas stream in said differing flow regions;
  defining the flow velocity and/or the retention time of an exhaust gas stream or a partial stream of an exhaust gas stream in said differing flow regions in such a way that in a first group of said flow regions, essentially fine particles having a defined size are removed by diffusion, and in at least one further group of said flow regions, essentially, in contrast to the fine particles, larger and/or heavier coarse particles are removed due to their mass moment of inertia.

35. A method according to claim 34, which includes the further steps of:
  deflecting an exhaust gas stream, which is in a high velocity flow region and has a prescribed high velocity, in such a way that coarse particles of a specific size and/or weight can no longer follow the exhaust gas stream due to their mass moment of inertia and are removed, by being collected in a particle collection and/or storage device, and
  slowing down an exhaust gas stream in a low velocity flow region that has a lower flow velocity than exists in said high velocity flow region in such a way that in contrast to said coarse particles smaller and/or lighter fine particles are removed from the exhaust gas stream by diffusion.

36. A method according to claim 34, which includes the further step of oxidizing carbon-containing particles removed in said particle separator with the aid of $NO_2$ formed on a catalyst for oxidation of NO.

37. A method according to claim 34, which includes the further step of raising the temperature of the exhaust gas stream to oxidize carbon-containing particles removed in said particle separator.

* * * * *